United States Patent
Poole et al.

(10) Patent No.: US 10,338,256 B2
(45) Date of Patent: *Jul. 2, 2019

(54) DEMULTIPLE USING UP/DOWN SEPARATION OF TOWED VARIABLE-DEPTH STREAMER DATA

(71) Applicant: CGG SERVICES SAS, Massy (FR)

(72) Inventors: Gordon Poole, East Grinstead (GB); Simon King, Bromley (GB)

(73) Assignee: CGG SERVICES SAS, Massy (FR)

( * ) Notice: Subject to any disclaimer, the term of this patent is extended or adjusted under 35 U.S.C. 154(b) by 14 days.

This patent is subject to a terminal disclaimer.

(21) Appl. No.: 15/610,980

(22) Filed: Jun. 1, 2017

(65) Prior Publication Data
US 2017/0269247 A1     Sep. 21, 2017

Related U.S. Application Data

(63) Continuation of application No. 14/519,405, filed on Oct. 21, 2014, now Pat. No. 9,784,870.

(60) Provisional application No. 61/894,104, filed on Oct. 22, 2013.

(51) Int. Cl.
*G01V 1/36* (2006.01)
*G01V 1/38* (2006.01)

(52) U.S. Cl.
CPC .............. *G01V 1/364* (2013.01); *G01V 1/38* (2013.01); *G01V 2210/56* (2013.01)

(58) Field of Classification Search
None
See application file for complete search history.

(56) References Cited

U.S. PATENT DOCUMENTS

| | | |
|---|---|---|
| 7,336,561 B2 | 2/2008 | Borresen |
| 2002/0118602 A1 | 8/2002 | Sen et al. |
| 2004/0145968 A1 | 7/2004 | Brittan et al. |
| 2006/0074562 A1 | 4/2006 | Amundsen et al. |
| 2006/0133202 A1 | 6/2006 | Tenghamn |
| 2010/0054081 A1 | 3/2010 | Barr et al. |
| 2012/0213032 A1 | 8/2012 | Herrmann et al. |
| 2013/0163376 A1 | 6/2013 | Poole |
| 2013/0242696 A1 | 9/2013 | Groenestijn et al. |
| 2013/0329520 A1 | 12/2013 | Borselen |

OTHER PUBLICATIONS

Arthur B. Weglein et al., "An Inverse-Scattering Series Method for Attenuating Multiples in Seismic Reflection Data", Geophysics, Nov.-Dec. 1997, pp. 1975-1989, vol. 62, No. 6.
Eric Verschuur, "Seismic Multiple Removal Techniques: Past, Present and Future", 2006 EAGE Education Tour (EET), Oct. 17, 2006 (Lecture schedule only).
Gordon Poole, "Pre-Migration Receiver De-Ghosting and Re-Datuming for Variable Depth Streamer Data", SEG 83rd Annual Meeting, Houston, Sep. 22-27, 2013, pp. 4216-4220.
(Continued)

*Primary Examiner* — Hovhannes Baghdasaryan
(74) *Attorney, Agent, or Firm* — Patent Portfolio Builders PLLC

(57) ABSTRACT

Methods and systems for processing data acquired using a variable-depth streamer, obtain up-going and down-going wavefields at a predetermined datum, and use them to identify multiples included in the up-going wavefield. An image of a geological formation under the seabed is then generated using the data from which the multiples have been removed, and/or the multiples.

20 Claims, 9 Drawing Sheets

(56) References Cited

OTHER PUBLICATIONS

Mariusz Majdański et al., "Attenuation of Free-Surface Multiples by Up/Down Deconvolution for Marine Towed-Streamer Data", Geophysics, Nov.-Dec. 2011, pp. V129-V138, vol. 76, No. 6.

Robert Soubaras, "Deghosting by Joint Deconvolution of a Migration and a Mirror Migration", SEG 80th Annual Meeting, Denver, Oct. 17-22, 2010, pp. 3406-3410.

Shuqian Dong et al., "Interferometric Extrapolation of OBS and SSP Data", SEG 78th Annual Meeting, Las Vegas, Nov. 9-14, 2008, pp. 3013-3017.

Yan Mei et al., "A Weighted Adaptive Subtraction for Two or More Multiple Models", SEG 80th Annual Meeting, Denver, Oct. 17-22, 2010, pp. 3488-3492.

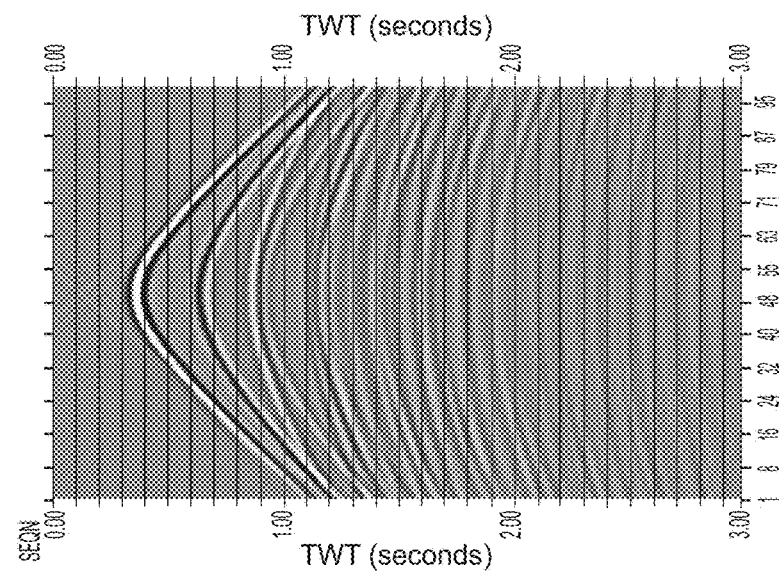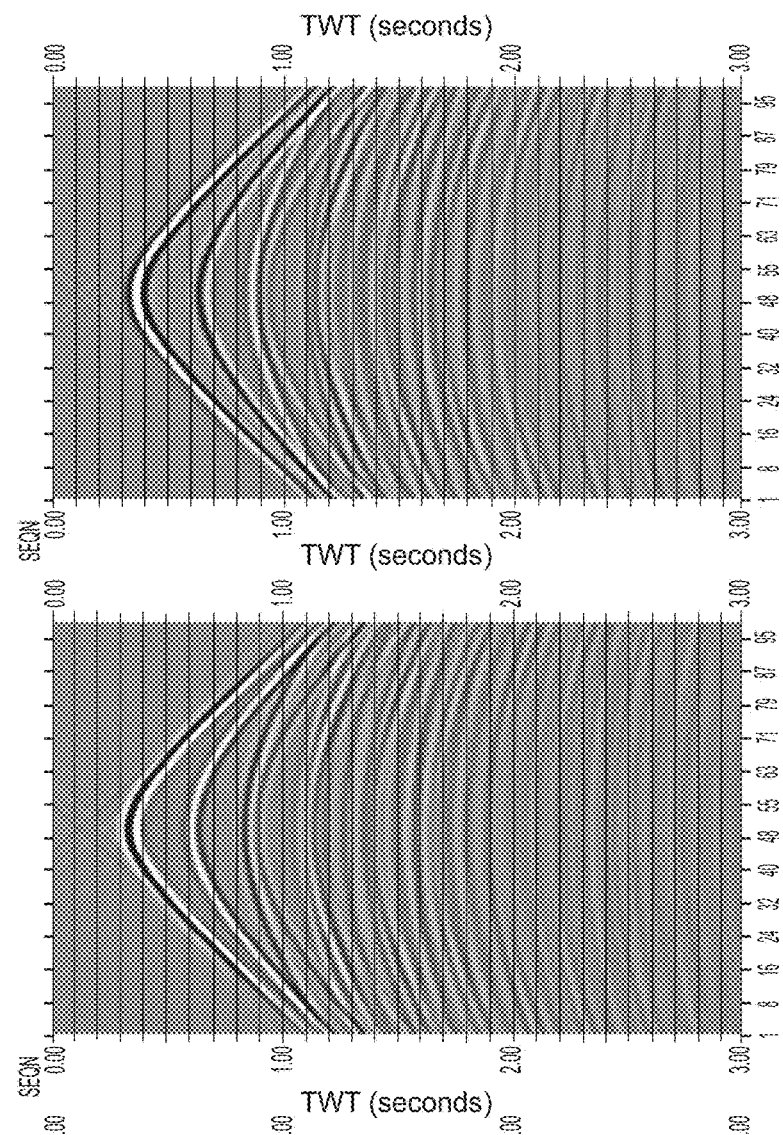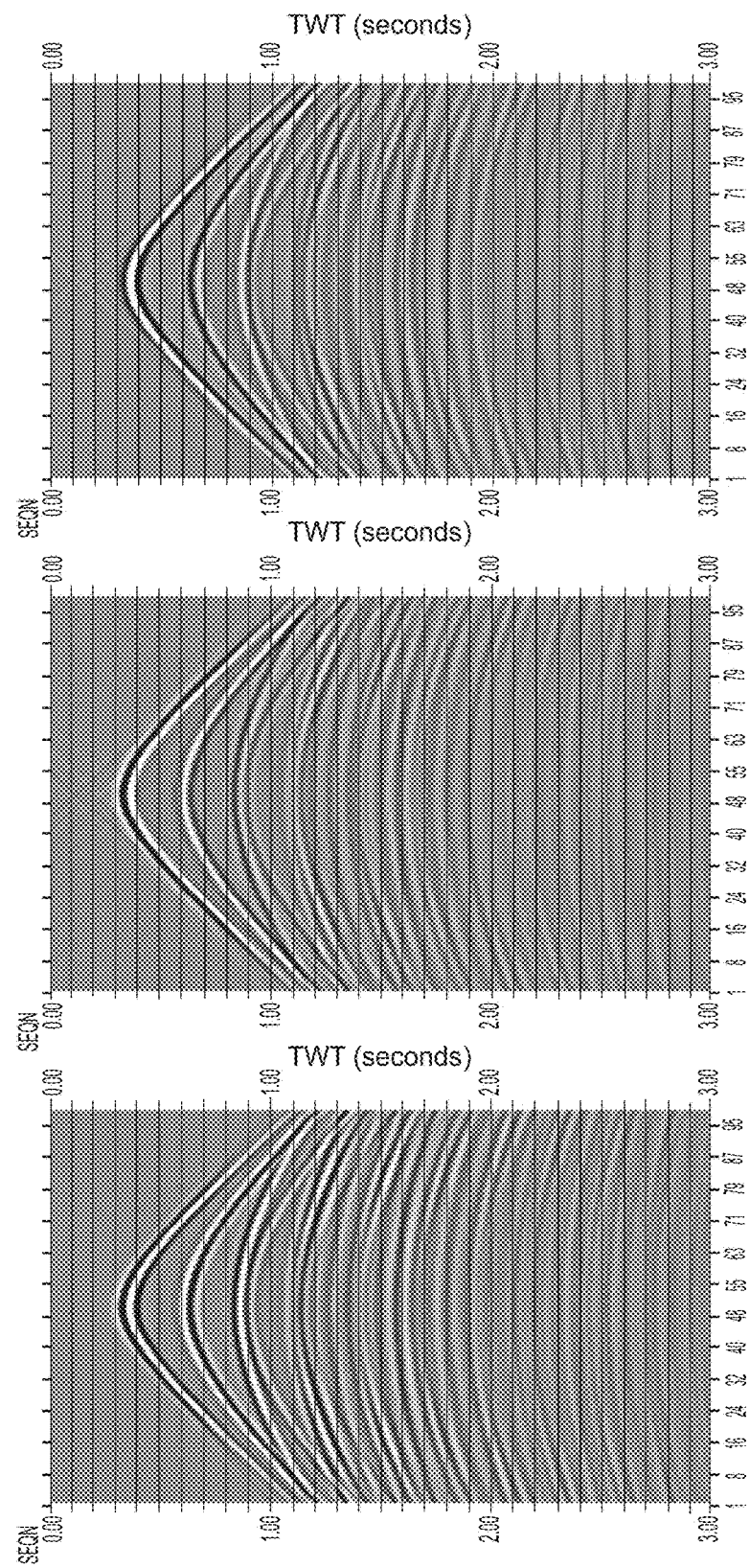

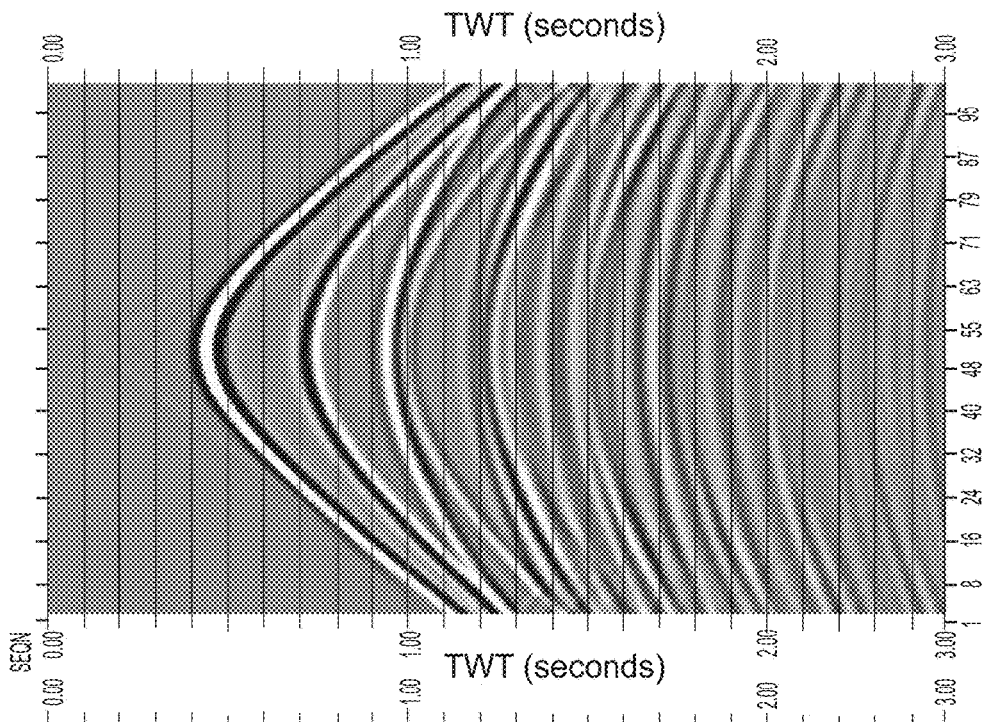
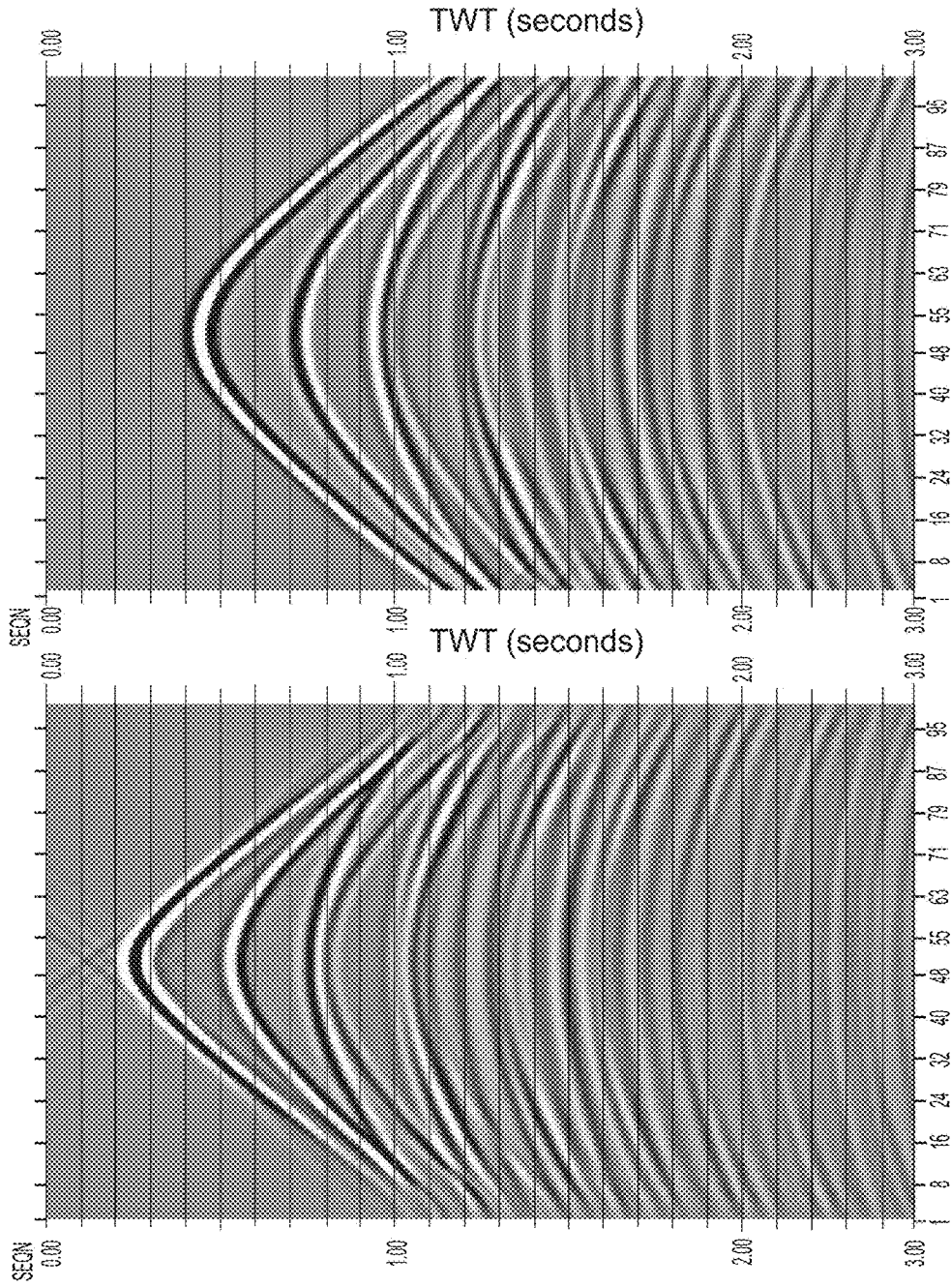
Fig. 7A
Fig. 7B

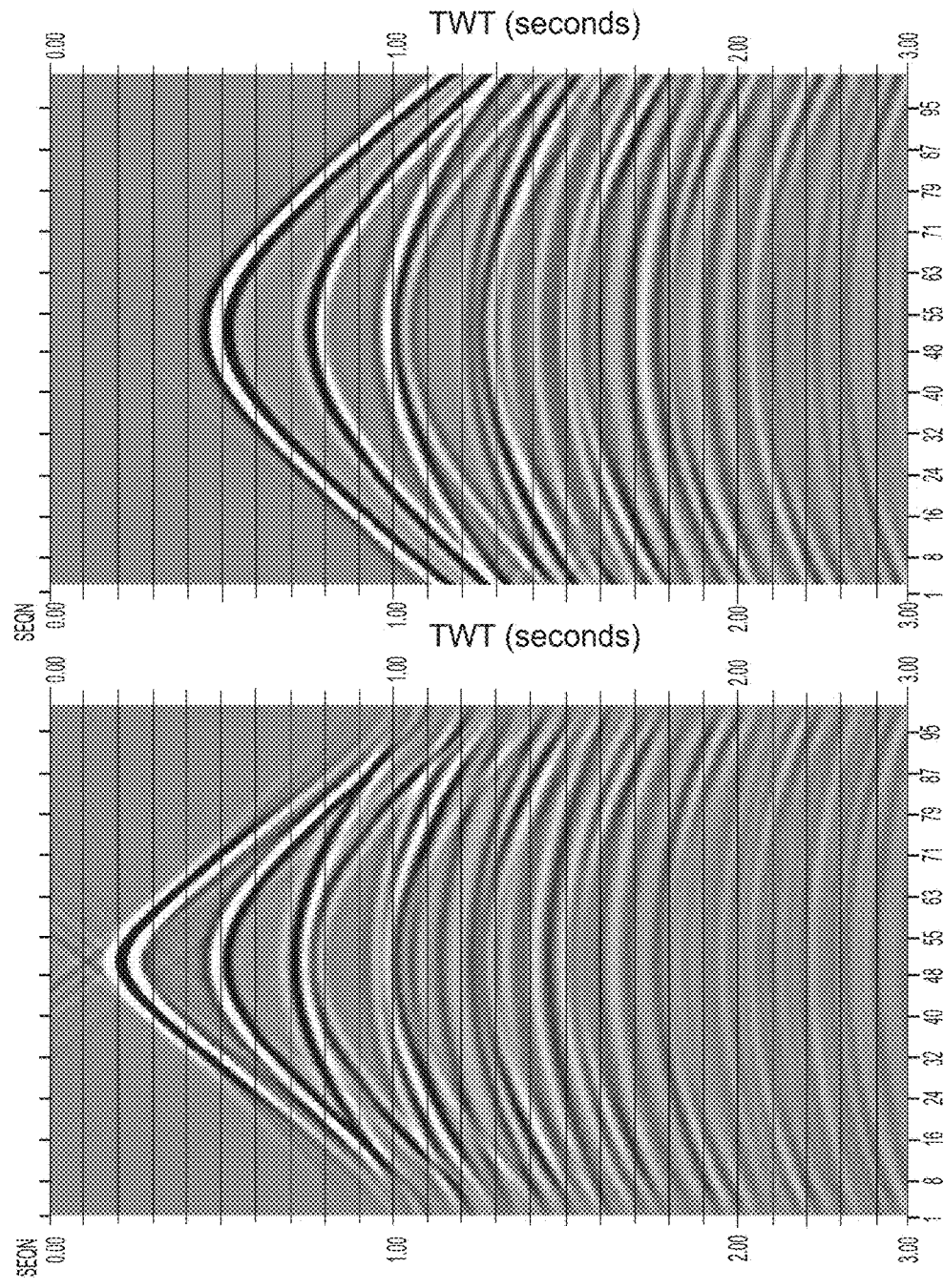

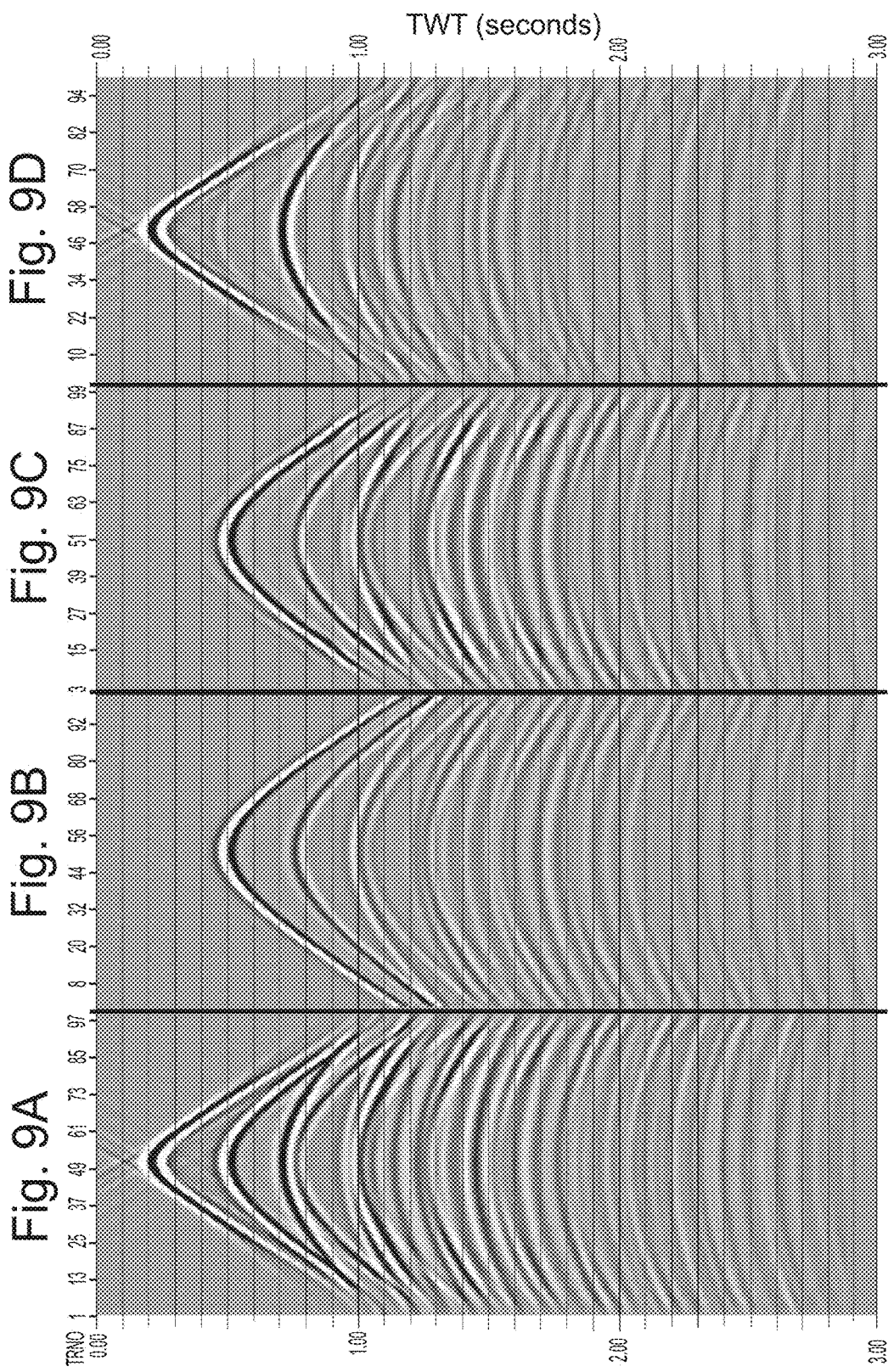

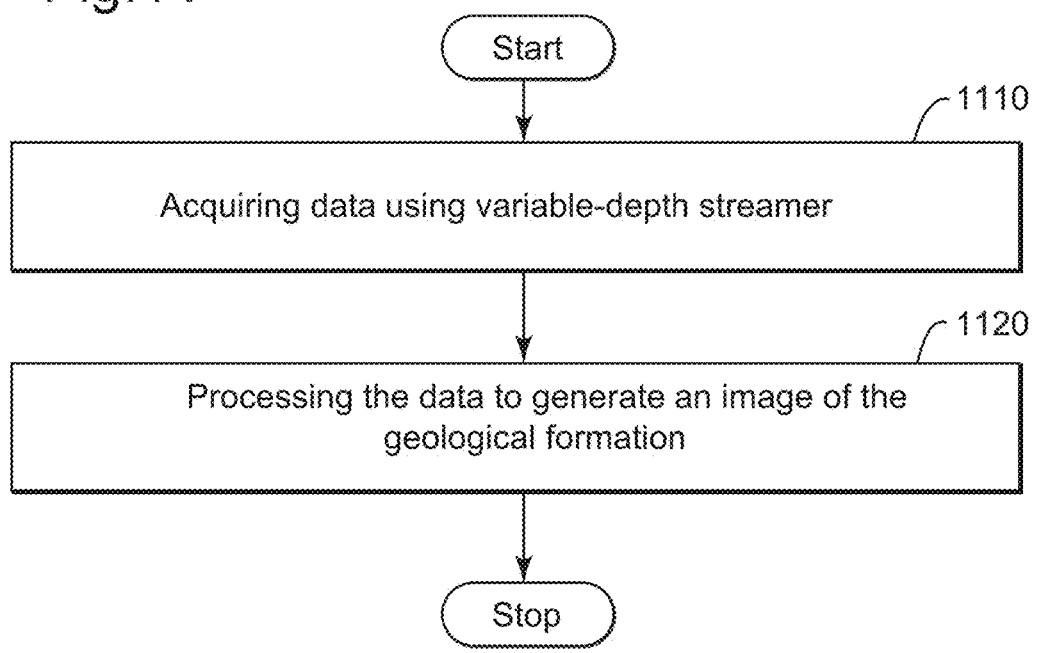

DEMULTIPLE USING UP/DOWN SEPARATION OF TOWED VARIABLE-DEPTH STREAMER DATA

CROSS REFERENCE TO RELATED APPLICATIONS

This application is a continuation of U.S. patent application Ser. No. 14/519,405, filed Oct. 21, 2014, which claims priority and benefit from U.S. Provisional Patent Application No. 61/894,104, filed Oct. 22, 2013, for "Demultiple Using Up/down Separation of Towed Variable-depth Streamer Data," the content of which is incorporated in its entirety herein by reference.

BACKGROUND

Technical Field

Embodiments of the subject matter disclosed herein generally relate to processing seismic data acquired using a streamer towed to have a variable-depth profile, more specifically, to identifying multiples included in the up-going wavefield using up-going and down-going wavefields at a predetermined datum.

Discussion of the Background

In seismic acquisition, energy (i.e., a seismic wave) generated by a seismic source propagates downward into a geological formation, and part of the energy is reflected back up. Characteristics of the reflected energy detected by seismic sensors are used to produce an image of the earth's reflectivity. In marine data acquisition, the sensors are housed by a streamer towed underwater.

Two types of multiple reflections complicate seismic data processing: water surface-related multiples and inter-bed multiples. Surface-related multiples occur when energy reflected from the subsurface reaches the air-water surface and is reflected back downward into the water column and the geological formation under the seabed. This energy reflected at the air-water surface produces a second train of energy reflected from the geological formation. Inter-bed multiples are similar, but in this case the downward-reflecting surface is a rock interface inside the geological formation.

Over the years, many methods have been developed to suppress multiples. One method, known as "radon demultiple," is a modeling approach usually in the common midpoint (CMP) domain, where the difference in moveout is used to discriminate between primary energy, which is usually faster, and multiple energy, which arrives later in time. The data is first normal-moveout corrected and then a parabolic radon model is generated. In the radon model, primary and multiple energy are distributed on different parabolas which allows for the multiple energy to be identified and consequently selected. The multiple energy is then reverse-transformed back to the offset-time domain. Finally, the multiple energy is subtracted from the original input data. The "radon demultiple" method is only effective when moveout discrimination between primary and multiples energy is apparent. Therefore, this method is often ineffective in shallow water environments or at near offsets.

Another method known as "surface-related multiple elimination" (SRME) uses convolutions and summations to estimate the multiple energy. With sufficient sampling of sources and receivers, this approach may produce a multiple model with the correct kinematic timing. Any amplitude, timing or phase errors are usually subsequently corrected with adaptive subtraction of the multiple model from the original data. However, the SRME method is difficult to use when the input data is not sufficiently well spatially sampled. In addition, the SRME method relies on an adaptive subtraction step.

Yet another method known as "deconvolution" may be applied either in the offset-time or a model (e.g. tau-p) domain. This method builds a prediction operator based on an auto-correlation of the data. The auto-correlation, which contains energy at the multiples periods, is used to derive a deconvolution operator (based on user parameters) to be applied to the data. This deconvolution method is often only suitable for shallow water and for simple structures.

Another method known as "wave-equation modeling" produces a multiple model by forward extrapolating seismic reflections into the subsurface and back to the receiver datum. The extrapolation step requires a reflectivity and velocity model. This method is suitable for modeling long-period multiples and relies on an adaptive subtraction step as well as some knowledge of the subsurface (e.g., reflectivity and velocity).

According to yet another method known as "inverse scattering," a multiple model is predicted by constructing a subseries of the scattering series, which corresponds to the multiples and may be used for 2D and 3D multiple prediction. This method is described in the article, "An inverse-scattering series method for attenuating multiples in seismic reflection data," published in 1997 in Geophysics, 62, No. 6, pages 1975-1989, the content of which is incorporated in its entirety herein by reference. This method also requires dense source and receiver (i.e., detector) sampling.

As pointed out in the book, "Seismic multiple removal techniques past, present and future," by Verschuur, D. J., a 2006 EAGE publication, the content of which is incorporated in its entirety herein by reference, each of the methods discussed in this section can be ineffective under certain conditions/environments.

Therefore, multiples removal remains a subject of continuing research, with new opportunities and challenges occurring as data acquisition systems evolve, for example, by towing streamers according to a variable depth profile instead of towing at a substantially constant depth.

SUMMARY

In various embodiments, sea-surface related multiples for data acquired using a variable-depth streamer are identified using an up-going wavefield and a down-going wavefield at a predetermined datum.

According to one embodiment, there is a method for processing data acquired using a variable-depth streamer. The method includes obtaining an up-going wavefield and a down-going wavefield at a predetermined datum from the data, using a de-ghosting method. The method further includes identifying multiples based on the up-going wavefield and the down-going wavefield at the predetermined datum. The method also includes generating an image of a geological formation under the seabed using data from which the multiples have been removed, and/or the multiples.

According to another embodiment, an apparatus for seismic data processing includes an input-output interface configured to receive data acquired using a variable-depth streamer and a data processing unit. The data processing unit is configured to obtain an up-going wavefield and a down-going wavefield at a predetermined datum from data acquired using the variable-depth streamer, to identify multiples based on the up-going wavefield and the down-going wavefield at the predetermined datum, and to generate an image of a geological formation under the seabed using data from which the multiples have been removed, and/or and the multiples.

According to yet another embodiment, there is a computer-readable medium configured to store executable codes which, when executed by a computer, perform a method for processing data acquired using a variable-depth streamer. The method includes obtaining an up-going wavefield and a down-going wavefield at a predetermined datum from data acquired using the variable-depth streamer. The method further includes identifying multiples based on the up-going wavefield and the down-going wavefield at the predetermined datum. The method also includes generating an image of a geological formation under the seabed using data from which the multiples have been removed, and/or and the multiples.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6A illustrates simulated data, FIG. 6B illustrates an up-going wavefield at the detection datum, as extracted from the simulated data, and FIG. 6C illustrates a down-going wavefield at the detection datum, as extracted from the simulated data;

FIG. 7A illustrates the up-going wavefield at a predetermined depth (135 m), and FIG. 7B illustrates the down-going wavefield at the same predetermined depth;

FIG. 8A illustrates the up-going wavefield at the seabed, and FIG. 8B illustrates the down-going wavefield at the seabed;

FIG. 9A illustrates the up-going wavefield at the seabed, FIG. 9B illustrates the down-going wavefield at the seabed, FIG. 9C illustrates the multiples at the seabed which are removed by adaptive subtraction, and FIG. 9D illustrates the data at the seabed after the multiples in FIG. 9C are removed;

FIG. 11 is a flowchart of a method according to another embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic data acquisition towing a variable-depth streamer. However, similar embodiments and methods may be used for a marine data acquisition system towing horizontal streamers and for surveys using electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments, an up-going wavefield and a down-going wavefield at a predetermined datum are obtained from marine seismic data. Obtaining these wavefields may be performed using a de-ghosting method for marine seismic data acquired using a streamer towed with a predetermined variable-depth profile. Multiples included in the up-going wavefield are identified using the obtained up-going and down-going wavefields, and may then be used to generate an image of the geological formation under the seabed.

Figure 1:
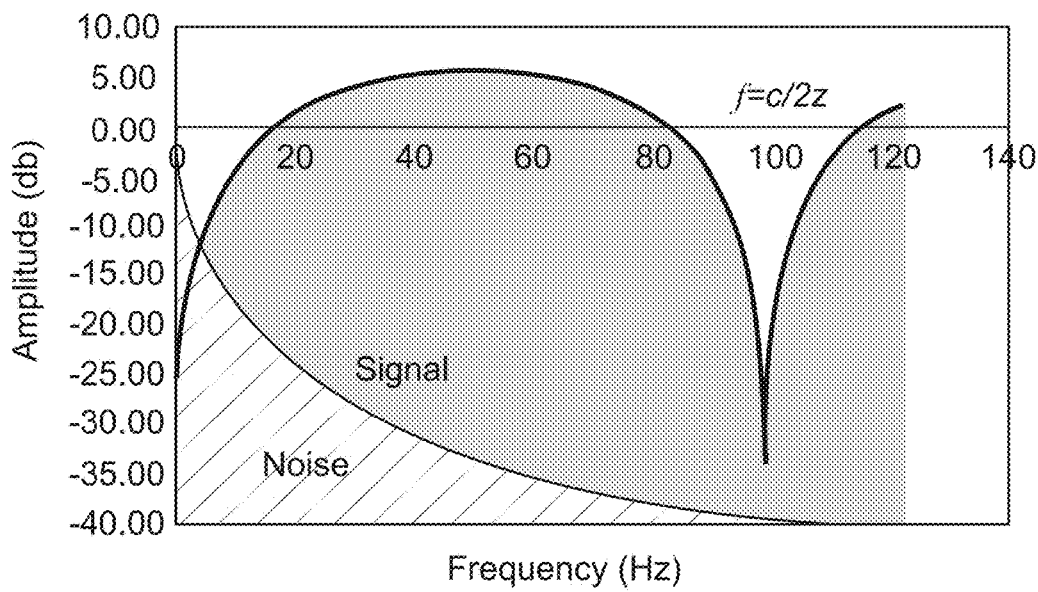
FIG. 1 is a graph showing frequency distribution of recorded data acquired with a horizontally-towed streamer.

In marine data acquisition systems, a vessel tows a cable called a streamer, which houses seismic wave detectors. The detectors may be hydrophones, accelerometers, differential pressure sensors, or other types of particle motion sensors. The detectors sense both primary reflections (i.e., desired energy which has been reflected once from the subsurface) and multiple reflections (i.e., energy which was reflected downward at least once either at the sea surface or within the geological formation before being recorded at the detectors). A free surface ghost is the down-going component of the wavefield recorded after the energy was reflected at the sea surface. Ghosts interfere with up-going primary signals, distorting the bandwidth of the seismic signal recorded by the detectors (e.g., yielding frequency notches when interfering destructively). The frequencies at which these notches occur depend on the detection depth. FIG. 1 illustrates the frequency distribution of data acquired with a streamer towed substantially horizontal to the sea surface, at a depth of approximately 7-8 m. A frequency notch occurs at approximately 100 Hz.

Figure 2:
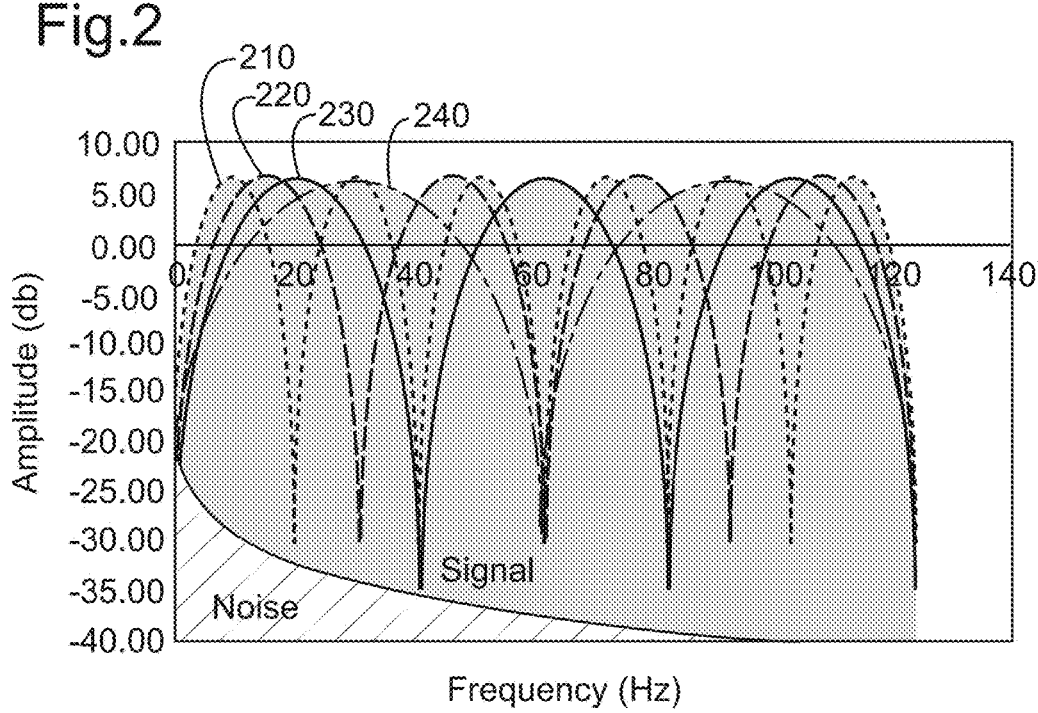
FIG. 2 is a graph showing frequency distribution of recorded data acquired with a variable-depth streamer.

Instead of being towed at a constant depth, streamers can be towed with a predetermined variable-depth profile relative to the water's surface (these streamers are called variable-depth streamers). Frequently (although not exclusively or limiting), a variable-depth streamer has a shallow depth at the near-offsets (closer to the vessel and the seismic source) and is towed deeper (e.g., up to 50 m) at the far-offsets (e.g., up to 8,000 m from the streamer's head). By towing the streamer with a variable-depth profile instead of a substantially constant depth, the frequencies at which ghost reflections distort the seismic signal vary, depending on offsets of individual detectors. This effect is illustrated in the FIG. 2 graph representing frequency distribution of data acquired with a variable-depth streamer. Curve 210, which corresponds to a detector at a depth six times the depth of the horizontally towed streamer whose signal frequency distribution is illustrated in FIG. 1, has six frequency notches between 0-100 Hz. Similarly, curve 220, which corresponds to a detector at a depth four times the depth of the horizontally towed streamer, has four frequency notches between 0-100 Hz. Curve 230, which corresponds to a detector at a depth three times the depth of the horizontally towed streamer, has three frequency notches between 0-100 Hz. And curve 240, which corresponds to a detector at a depth twice the depth of the horizontally towed streamer, has two frequency notches between 0-100 Hz. When data from all the detectors is combined, the envelope of the curves is substantially free of ghost notches. Absence of frequency notches allows for receiver-side ghost removal and, hence, separation of the recorded data into up-going and down-going wavefields at the detector. Another advantage of the variable-depth streamer is that the deeper the detection location, the better the signal to noise ratio of the data.

Removing receiver-side ghost reflections (or down-going energy) from the data acquired using a variable-depth streamer is a form of wavefield separation (i.e., recovering up-going and down-going wavefields). The up-going wavefield contains desirable primary reflections and the remaining multiples whose last bounce is upward toward the detectors. The down-going wavefield contains the ghost reflections.

A method for up-going and down-going wavefield separation of variable-depth streamer data using migration and mirror migration data is described in the article, "Deghosting by joint deconvolution of a migration and a mirror migration," by Soubaras, R., published in 80th SEG Annual Meeting, Expanded Abstracts 29, pp. 3406-3410, 2010, the content of which is incorporated in its entirety herein by reference.

In various embodiments described hereinafter, wavefield separation is applied to the recorded data before migration and typically early in the processing flow. This approach is commonly referred to as pre-migration deghosting. Any pre-migration deghosting method can be used (e.g., deghosting using a tau-p model as described in the article, "Pre-migration de-ghosting and re-datum ing for variable depth streamer data," by G. Poole, SEG Technical Program Expanded Abstracts 2013, pp. 4216-4220, and U.S. Patent Application Publication No. 2013/0163376 A1, the contents of which are incorporated in their entirety herein by reference).

Wavefield separation yields the up-going and down-going wavefields usable in a demultiple process. Up-going and down-going wavefields are first extrapolated from the locus of the variable-depth streamer to a pre-determined datum. The location of the pre-determined datum depends on the manner in which removing the multiples (i.e., demultiplying) is performed (some implementation of the demultiple step are discussed later in this document). Two separate extrapolations are performed: one for the up-going wavefield and one for the down-going wavefield. In one embodiment, the up-going wavefield is inverse-extrapolated (i.e., propagated backward in time) to a pre-determined datum, and the down-going wavefield is forward-extrapolated (i.e., propagated forward in time) to the same pre-determined datum. The extrapolated up-going and down-going wavefields appear to have been recorded at this different datum instead of being recorded at a datum determined by the variable-depth streamer.

The extrapolated data may cover the same shot-receiver offset range as the input data or may cover a shorter or a larger shot-receiver offset range. Extrapolating the data to shorter offsets may enable better prediction of the near channel multiples. In particular, extrapolation of the up-going wavefield to shorter offsets may improve redatuming of the up-going wavefield to the pre-determined datum. In one embodiment, shorter offset data may be extrapolated before the demultiple process, using conventional techniques, e.g., NMO copy, fx extrapolation, sparse Radon extrapolation, etc.

Various extrapolation methods may be used. All extrapolation methods require a velocity model. Since the datum is often preferable within the water column, only a simple water velocity model may be needed. Note that the term "water velocity" means the velocity of the wave (sound) propagating through water. Wave-equation methods such as phase-shift (frequency-wavenumber), Kirchhoff (frequency-space) or space-time methods may be applied to perform the forward and inverse extrapolation. The pre-stack deghosting algorithm (described in U.S. Patent Application Publication No. 2013/0163376 A1) may output the data at a chosen datum, thus combining wavefield separation and extrapolation in a single operation.

The seabed is a frequent choice of extrapolation datum because, at this position, the receiver-side water-layer multiples in the up-going wavefield are equal to the down-going wavefield multiplied by the reflection coefficient of the seabed, R. In most surveys, the depth of the seabed is well-determined using picked near-offset travel times, using measurements from echo sounders, or information available from a near-offset migration section. Water velocity may be estimated from the data or measured directly. For example, a Temperature Salinity Dip (TSDIP) device measuring temperature, salinity, and depth may be used to determine the water velocity using an equation to relate the measured characteristics to the water velocity.

Figure 3:
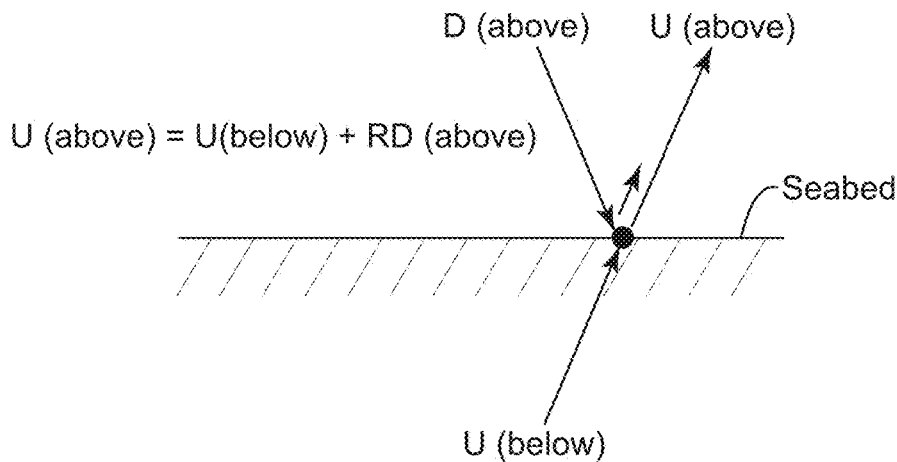
FIG. 3 is a diagram illustrating a demultiple method according to an embodiment.

At the seabed, the down-going wavefield may be considered as a model of the water-related multiples in the up-going wavefield. As illustrated in FIG. 3, up-going wavefield U (above) (which can be obtained from the data and then extrapolated at the seabed) is a sum of the up-going wavefield U (below), which includes the primary reflections, inter-bed multiples and surface-related multiples whose last upward bounce occurs beneath the seabed, and the down-going wavefield D (above) multiplied by the reflection coefficient of the seabed, R. Therefore, removing the down-going wavefield from the up-going wavefield has the effect of suppressing all remaining receiver-side water-layer multiples. In one embodiment, the demultiple step is then expressed as U-RD, where U corresponds to the up-going wavefield, D corresponds to the down-going wavefield, and R is the reflection coefficient of the seabed.

Various methods may be used to subtract the down-going wavefield from the up-going wavefield. One embodiment uses straight subtraction, i.e., the down-going wavefield (scaled by the reflection coefficient R) is subtracted from the up-going wavefield. In another embodiment, the down-going wavefield (scaled by the reflection coefficient R or not) is subtracted from the up-going wavefield after application of a matching filter. The matching filter minimizes the energy between the multiple model (down-going wavefield) and the multiples in the data (up-going wavefield). This procedure is known as an adaptive subtraction, and is often used when the multiple model does not exactly match the multiples in the original data. Adaptive subtraction compensates for differences in arrival time, amplitude and phase between the data and the model. Adaptive subtraction may be used even when the reflection coefficient is not known or merely estimated. A common minimization criterion is the least-squares norm, but other possible minimization criteria may be used and are well-known in the art. Adaptive subtraction is performed in the domain deemed most suitable, e.g., common-shot domain, common-channel domain, common-receiver domain, common-slowness domain, curvelet, tau-p, etc.

In one embodiment, instead of using adaptive subtraction with a single multiple model, several multiple models may be adaptively subtracted simultaneously using a method called multi-model adaptive subtraction (which is described in the article, "A Weighted Adaptive Subtraction for Two or More Multiple Models," by Y. Mei and Z. Zou, published in SEG Technical Program Expanded Abstracts 2010: pp. 3488-3492, the content of which is incorporated in its entirety herein by reference). The use of multi-model adaptive subtraction has the effect of simultaneously subtracting the down-going wavefield and multiples models from other methods outlined in the "Discussion of the Background" section. In one embodiment, multi-model adaptive subtraction uses primary protection based on an estimate of the primary data; the multi-model adaptive subtraction then subtracts both primary and multiples models from the input data so that the output data consists of the residual plus adapted primary datasets.

Preferably, subtraction of the down-going wavefield from the up-going wavefield is not limited to either straight or adaptive subtraction, but a combination of the two. For example, straight subtraction can be an intermediate step yielding an estimate of the local reflection coefficient. This intermediate step enables using a scaled version of the down-going wavefield (which is the multiple model) in a subsequent adaptive subtraction step. As a further example, straight subtraction may work well following an adaptive subtraction if the phase of the arrivals is broad. On the other hand, adaptive subtraction may be deemed more suitable to be applied in a first step if a complex near-surface distorts the phase and amplitudes of the arrivals.

As an alternative to the demultiple method just described, surface-related multiples can be removed at the new datum level by an up/down deconvolution. That is, up-going multiples are removed by dividing the up-going wavefield by the down-going wavefield in a spectral domain (e.g., Fourier, Laplace, Z-transform, frequency-wavenumber, tau-p, etc.). The up/down deconvolution has previously been applied to ocean-bottom cable data or ocean-bottom data where up-going and down-going wavefields are readily available. The up/down deconvolution has the advantage that no subtraction step is necessary, but the down-going wavefield must include the direct/incident arrival. The up/down deconvolution can be performed at the seabed or at another suitable datum within the water column. Although the up/down deconvolution does not need to be performed as an alternative to the demultiple step, it can be used as a preceding or as a subsequent step thereof to enhance multiples suppression.

Once the primary and multiple datasets at the seabed (or at another datum) are obtained, they can be used in various ways to generate an image of the geological formation under the seabed.

In one embodiment, the primary dataset is extrapolated back to the streamer locus or other datum. In another embodiment, the primary dataset is extrapolated back to the streamer locus or other datum and used to recreate the ghost energy (re-ghosted).

Alternatively or additionally, the multiple dataset may also be extrapolated back to the streamer locus. In one embodiment, this extrapolated multiple dataset may be then subtracted from deghosted data. In another embodiment, the extrapolated multiple dataset is used to recreate the ghost energy (re-ghosted) and then subtracted from the original data.

In some embodiments, data processing is continued without extrapolating the primary and/or multiples to another datum (e.g., at the seabed datum). In one embodiment, the primary and multiple datasets are migrated separately, for example, using mirror-migration for the multiples, which may yield an improved illumination, especially for the shallow water data.

In some embodiments, the up-going and down-going wavefields are used in interferometry (a procedure essentially equivalent to redatuming) for interpolation and/or extrapolation of the data. In one embodiment, interferometry between the down-going wavefield and a model-based Green's function at the seabed yields new traces at shorter offsets than conventionally considered. In another embodiment, interferometry between the up-going multiple model and a model-based Green's function at the streamer level generates new traces at shorter offsets than conventionally considered. Examples of similar procedures are described in the article, "Interferometric extrapolation of OBS and SSP data," by Dong and Schuster, published in Proceeding of SEG Las Vegas 2008 Annual Meeting, pp. 3013-3017, the content of which is incorporated in its entirety herein by reference. Extending the data to shorter offsets has the effect of an increased aperture used for imaging. Other combinations between up-going and down-going wavefields are foreseeable for interpolation/extrapolation purposes.

Any subtraction steps combined in the above primary and multiple datasets processing for generating an image of the geological formation under the seabed may be straight subtraction or adaptive subtraction, as previously discussed.

Figure 4:
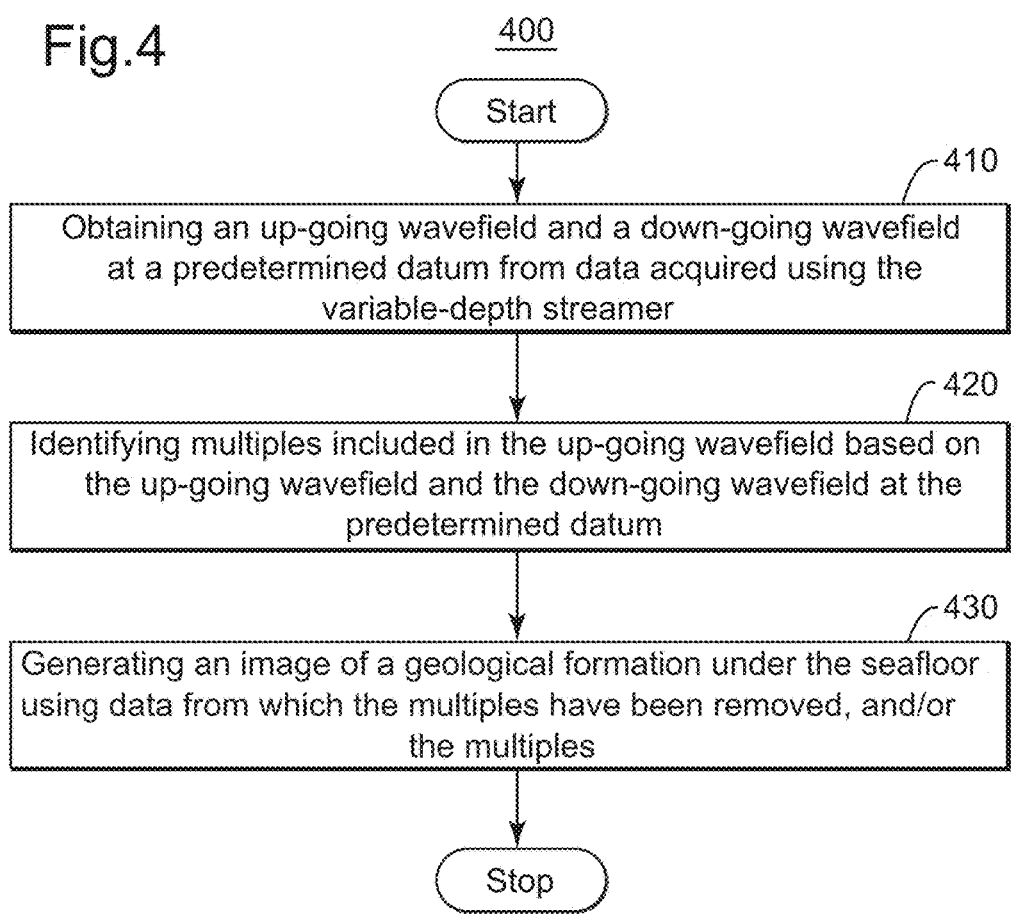
FIG. 4 is a flowchart of a method according to an embodiment.

FIG. 4 is a flowchart of a method 400 for processing data acquired using a variable-depth streamer. Method 400 includes obtaining an up-going wavefield and a down-going wavefield at a predetermined datum from the data acquired using the variable-depth streamer, at 410. A de-ghosting method may be used to obtain the up-going and down-going wavefields. Towing a variable-depth streamer (instead of a substantially horizontal streamer) provides receiver ghost diversity, thus increasing and extending the usable seismic bandwidth. This is advantageous for subsequent imaging and inversion applications. Towing deep at the far-offsets (i.e., at a great distance from the source) increases the signal-to-noise ratio and, thus, data can be acquired in areas where the weather window is limited.

Method 400 further includes identifying multiples included in the up-going wavefield based on the up-going wavefield and the down-going wavefield at the predetermined datum, at 420. Decomposing the data into an up-going wavefield and a down-going wavefield is another benefit of variable-depth acquisition, and it is particularly advantageous for identifying and/or removing multiples, as previously discussed. Up-going and down-going wavefields may be used in various applications with respect to interpolation and extrapolation. In particular, isolating the down-going wavefield is useful for identifying and/or removing multiples because variations in the sea-surface state, such as wave height and reflection coefficient, are appropriately taken into consideration.

Method 400 also includes generating an image of a geological formation under the seabed using data from which the multiples have been removed, and/or the multiples, at 430. As already mentioned, multiples removal can be achieved by up/down deconvolution. This is advantageous because since surface-related multiples are removed by a deconvolution process, adaptive subtraction is no longer necessary.

Figure 5:
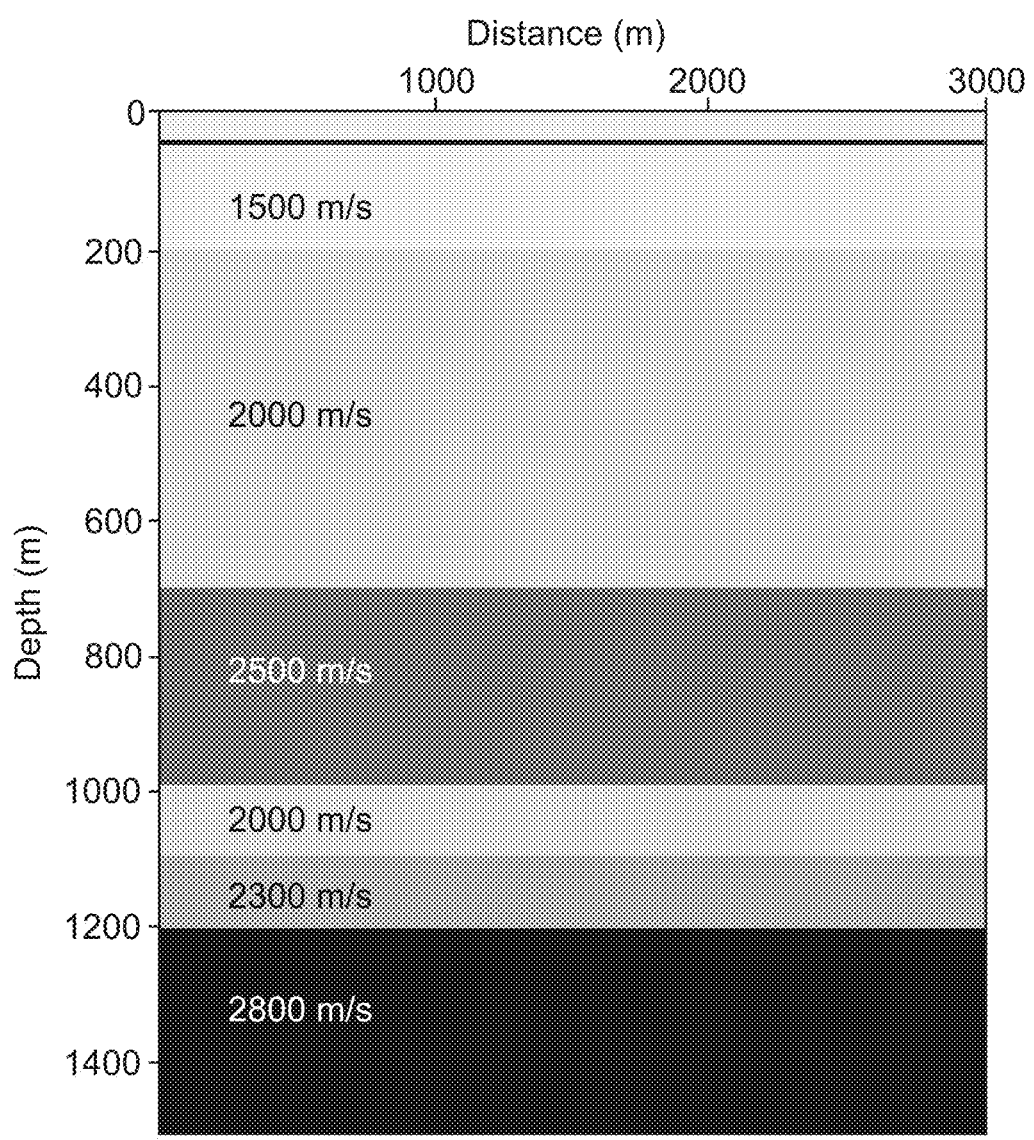
FIG. 5 is model of wave propagation velocity as a function of depth used for simulating data.

A one-dimensional (depth-only) velocity model is illustrated in FIG. 5. A source is fired at 5 m and recordings are made at a streamer towed at about 15 m depth. The maximum offset is 1,500 m. For simplicity, this illustration does not simulate data acquired using a variable-depth streamer, but the above-described embodiments can also be used for measurements acquired with streamers towed substantially horizontal (i.e., at a constant depth). The acquired data (pressure amplitude versus time and offset) is illustrated in FIG. 6A where the time increases downward, offsets (i.e., distances from the source) increase from left to right, and amplitude is represented by different shades of gray, white and black corresponding to opposite phases of the maximum amplitude.

Data in FIG. 6A is decomposed into an up-going wavefield (illustrated in FIG. 6B) and a down-going wavefield (illustrated in FIG. 6C) at the receiver-side using methods known in the art. The graphs in FIGS. 6B and 6C are represented in the same style (i.e., axes and amplitude correlated with the shades of gray) as FIG. 6A. The up-going wavefield is free of receiver-side ghosts.

The up-going wavefield in FIG. 6B is extrapolated backward in time to a datum at 135 m depth in the water column and illustrated in FIG. 7A. The down-going wavefield is extrapolated forward in time to the same datum at 135 m depth in the water column and illustrated in FIG. 7B. The wavefields are extrapolated using a frequency-wavenumber phase shift algorithm using a water velocity equal to 1,500 m/s, but other methods may be used. Comparing FIGS. 6B and 6C with FIGS. 7A and 7B, one observes that the water-layer-related multiples begin to align in time. For example, the second-arrival in FIG. 7A, which corresponds to a first-order multiple reflected from the first interface, almost overlaps the equivalent arrival in FIG. 7B.

Applying an up/down deconvolution using these up-going and down-going wavefields (i.e., corresponding to the datum at 135 m depth illustrated in FIGS. 7A and 7B) results in removing all receiver-side water layer multiples from the up-going wavefield. Note when applying the deconvolution, the incident (i.e., direct) wavefield is included in the down-going wavefield. This incident wavefield is not illustrated in FIGS. 6C and 7B.

Instead of using a datum at 135 m depth, the up-going and down-going wavefields may be extrapolated at the seabed (i.e., at 200 m depth). FIG. 8A illustrates the up-going wavefield in FIG. 6B after being extrapolated to the seabed. FIG. 8B illustrates the down-going wavefield in FIG. 6C after being extrapolated to the seabed. One observes that the receiver-side water-layer multiples align in the up-going and down-going wavefields.

FIGS. 9A-9D illustrate identification and removal of the multiples at the seabed. FIG. 9A is the same as FIG. 8A, representing the up-going wavefield at the seabed. FIG. 9B represents a scaled down-going field at the seabed, i.e., the down-going wavefield multiplied by the reflection coefficient (e.g., 0.49). FIG. 9C illustrates the multiples obtained by (adaptively) subtracting the scaled down-going wavefield at the seabed (in FIG. 9B) from the up-going wavefield at the seabed (in FIG. 9A). Specifically (but not limiting), the subtraction was performed using a least-squares norm matching filter in the shot domain.

FIG. 9D represents the demultiplied up-going wavefield (i.e., primary reflections, inter-bed multiples and remaining free-surface multiples) at the seabed, i.e., the difference between the up-going wavefield in FIG. 9A and the multiples in FIG. 9C. This demultiplied up-going wavefield and/or the multiples may then be extrapolated back to the original datum (i.e., the locus of the variable-depth streamer when data was acquired), in this example to 15 m depth, or at another datum for subsequent processing, in order to generate the image of the geological formation under the seabed.

While the description predominantly refers to 2D algorithms, 3D implementations of the deghosting and extrapolation may also be used. In addition, the wavefield separation may make use of a variable depth streamer equipped with multi-component sensors; i.e. particle motion (e.g. acceleration, velocity, differential pressure) in addition to hydrophone recordings.

Figure 10:
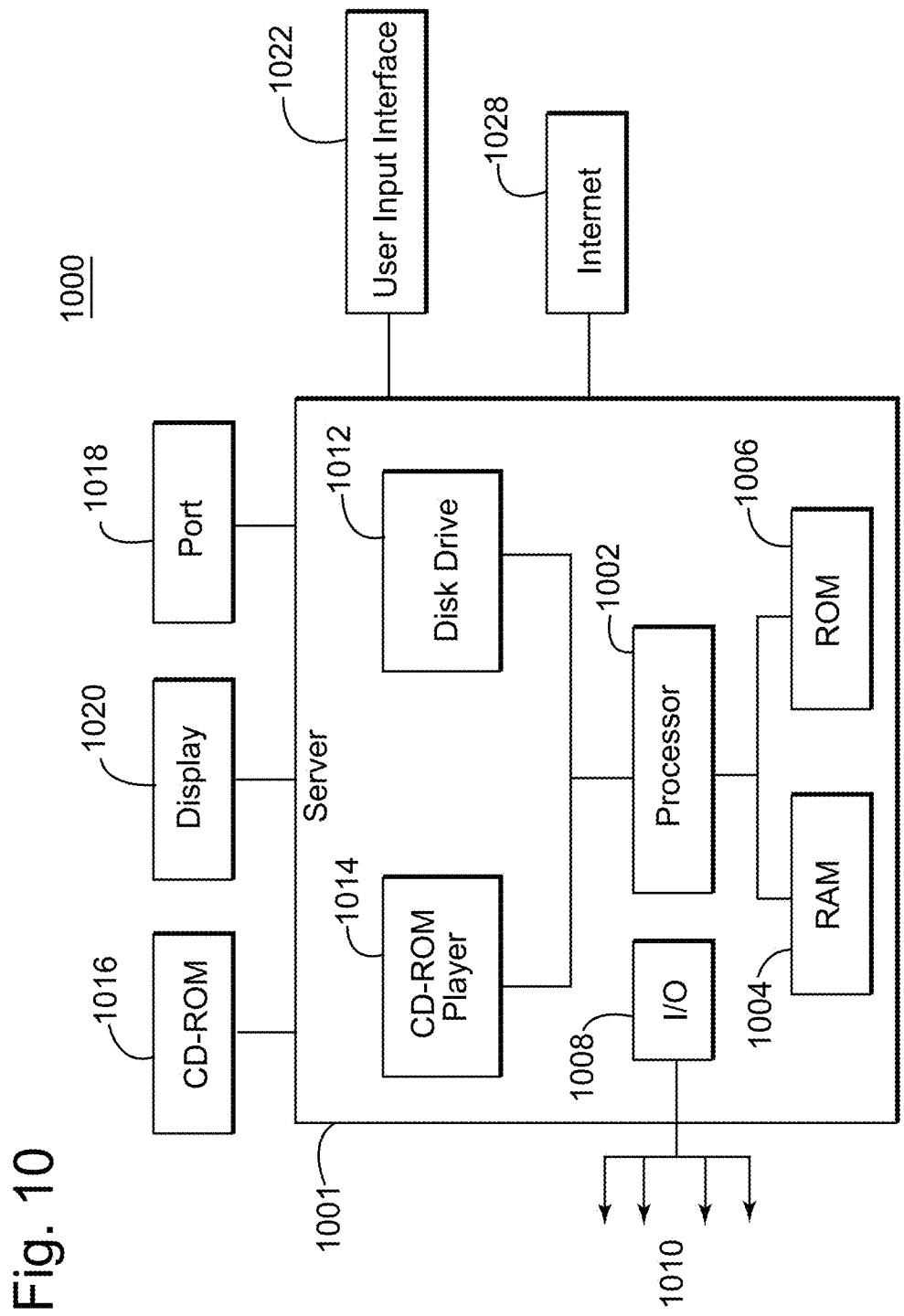
FIG. 10 is a schematic diagram of a computing device configured to implement methods for processing data according to an embodiment.

FIG. 10 is a schematic diagram of a computing device 1000 configured to implement methods for processing data according to an embodiment. Hardware, firmware, software or a combination thereof may be used to perform the various steps and operations of the above-described methods. The computing device 1000 may include a server 1001, which has a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The CPU 1002 communicates with other internal and external components through input/output (I/O) circuitry 1008 and bussing 1010, to receive the data acquired using a variable-depth streamer and output one or more of the multiples, the primaries and/or the image of the geological formation. The processor 1002 carries out a variety of functions as are known in the art, as dictated by software and/or firmware instructions.

The server 1001 may also include one or more data storage devices, including hard drives 1012, CD-ROM drives 1014, and other hardware capable of reading and/or storing information such as DVD, etc. In one embodiment, software for carrying out the above-discussed methods may be stored and distributed on a CD-ROM or DVD 1016, a USB storage device 1018 or other form of media capable of portably storing information. These storage media may be inserted into, and read by, devices such as the CD-ROM drive 1014, the disk drive 1012, etc. Server 1001 may be coupled to a display 1020, which may be any type of known display or presentation screen, such as LCD, plasma display, cathode ray tubes (CRT), etc. The image of the geological formation or graphs similar to the ones in FIGS. 5-8 may be shown on display 1020. A user input interface 1022 is provided and may include one or more user interface mechanisms such as a mouse, keyboard, microphone, touchpad, touch screen, voice-recognition system, etc.

Server 1001 may be coupled to other devices, such as sources, detectors, etc. The server may be part of a larger network configuration as in a global area network (GAN) such as the Internet 1028, which allows ultimate connection to various landline and/or mobile computing devices.

FIG. 11 is a flowchart of a method 1100 for exploring a geological formation under the seabed according to yet another embodiment. Method 1100 includes acquiring data using a variable-depth streamer at 1110. Method 1100 further includes processing the data to generate an image of the geological formation at 1120. The processing of the data includes identifying multiples based on an up-going wavefield and a down-going wavefield at a predetermined datum. The up-going wavefield and the down-going wavefields may be derived using an inversion and/or minimization method. Alternatively, the up-going wavefield and the down-going wavefields may be obtained using a de-ghosting method.

The disclosed embodiments enable processing marine seismic data that identify multiples based on up-going and the down-going wavefields. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing recorded data acquired using a variable-depth streamer, the method comprising:
   receiving the recorded data acquired using the variable-depth streamer;
   applying wavefield separation to the recorded data using a processor, at a locus of the variable-depth streamer, to obtain an up-going wavefield and a down-going wavefield at the locus of the variable-depth streamer;
   extrapolating the up-going wavefield and the down-going wavefield from the locus of the variable-depth streamer to a predetermined datum, different from the locus of the variable-depth streamer;
   calculating multiples by removing the extrapolated down-going wavefield at the predetermined datum from the extrapolated up-going wavefield at the predetermined datum;
   extrapolating the multiples at the locus of the variable-depth streamer;
   removing the extrapolated multiples from the up-going wavefield at the locus of the variable-depth streamer to obtain a primary dataset; and
   generating an image of a geological formation under the seabed using (1) the primary dataset, and/or (2) the multiples.

2. The method of claim 1, wherein the predetermined datum is the seabed.

3. The method of claim 1, wherein the extrapolated up-going wavefield and the extrapolated down-going wavefield at the predetermined datum are obtained using a wavefield separation based on a tau-p model thereof.

4. The method of claim 1, wherein information on a water velocity dependence on depth is used when extrapolating the up-going wavefield and the down-going wavefield to the predetermined datum.

5. The method of claim 1, wherein the extrapolated up-going wavefield and the extrapolated down-going wavefield at the predetermined datum are obtained using a sparse inversion method.

6. The method of claim 1, wherein the calculating of the multiples includes determining a matching filter that minimizes a difference between the extrapolated up-going wavefield and the extrapolated down-going wavefield at the predetermined datum.

7. The method of claim 1, wherein the calculating of the multiples is an iterative process.

8. The method of claim 7, wherein the iterative process uses at least two different methods to identify the multiples.

9. The method of claim 1, wherein the calculating of the multiples includes:
   transforming in a spectral domain the extrapolated up-going wavefield and the extrapolated down-going wavefield at the predetermined datum; and
   dividing the transformed up-going wavefield to the transformed down-going wavefield.

10. The method of claim 1, further comprising:
    extrapolating the multiples to another datum.

11. The method of claim 1, further comprising:
    migrating the multiples separately from the primary dataset, to another datum.

12. An apparatus for seismic data processing, the apparatus comprising:
    an input-output interface configured to receive recorded data acquired using a variable-depth streamer; and
    a data processing unit configured
      to apply wavefield separation to the recorded data, at a locus of the variable-depth streamer, to obtain an up-going wavefield and a down-going wavefield at the locus of the variable-depth streamer;
      to extrapolate the up-going wavefield and the down-going wavefield from the locus of the variable-depth streamer to a predetermined datum, different from the locus of the variable-depth streamer;
      to calculate multiples by removing the extrapolated down-going wavefield at the predetermined datum from the extrapolated up-going wavefield at the predetermined datum;
      to extrapolate the multiples at the locus of the variable-depth streamer;
      to remove the extrapolated multiples from the up-going wavefield at the locus of the variable-depth streamer to obtain a primary dataset; and
      to generate an image of a geological formation under the seabed using (1) the primary dataset, and/or (2) the multiples.

13. The apparatus for seismic data processing of claim 12, wherein the data processing unit is further configured to extrapolate the multiples to another datum before generating the image.

14. The apparatus for seismic data processing of claim 12, wherein the data processing unit is further configured to extrapolate the primary dataset to the another datum.

15. The apparatus for seismic data processing of claim 12, wherein the data processing unit is further configured to migrate the primary dataset to the predetermined datum.

16. The apparatus for seismic data processing of claim 12, wherein the predetermined datum is the seabed.

17. The apparatus for seismic data processing of claim 12, wherein the data processing unit is configured to obtain the extrapolated up-going wavefield and the extrapolated down-going wavefield at the predetermined datum using a wavefield separation based on a tau-p model thereof.

18. The apparatus for seismic data processing of claim 12, wherein the data processing unit is configured to obtain the extrapolated up-going wavefield and the extrapolated down-going wavefield at the predetermined datum using a sparse inversion method.

19. A method for exploring a geological formation under the seabed, the method comprising:
    receiving data recorded using a variable-depth streamer;
    processing the recorded data to generate an image of the geological formation,
    wherein the processing includes, applying wavefield separation to the recorded data, at a locus of the variable-depth streamer, to obtain an up-going wavefield and a down-going wavefield at the locus of the variable-depth streamer, the up-going wavefield and the down-going wavefields at the locus of the variable-depth streamer being derived using an inversion and/or minimization method, extrapolating the up-going wavefield and the down-going wavefield from the locus of the variable-depth streamer to a predetermined datum, different from the locus of the variable-depth streamer, calculating multiples based on the extrapolated up-going wavefield and the extrapolated down-going wavefield at the predetermined datum, extrapolating the multiples at the locus of the variable-depth streamer; and removing the extrapolated multiples from the up-going wavefield at the locus of the variable-depth streamer to obtain a primary dataset.

20. A non-transitory computer-readable medium configured to store executable codes which when executed by a computer perform a method for processing recorded data acquired using a variable-depth streamer, the method comprising:

receiving the recorded data acquired using the variable-depth streamer;

applying wavefield separation to the recorded data, at a locus of the variable-depth streamer, to obtain an up-going wavefield and a down-going wavefield at the locus of the variable-depth streamer;

extrapolating the up-going wavefield and the down-going wavefield from the locus of the variable-depth streamer to a predetermined datum, different from the locus of the variable-depth streamer;

calculating multiples by removing the extrapolated down-going wavefield at the predetermined datum from the extrapolated up-going wavefield at the predetermined datum;

extrapolating the multiples at the locus of the variable-depth streamer;

removing the extrapolated multiples from the up-going wavefield at the locus of the variable-depth streamer to obtain a primary dataset; and generating an image of a geological formation under the seabed using (1) the recorded data from which the multiples have been removed, and/or (2) the multiples.

* * * * *